United States Patent
McRae

(10) Patent No.: US 12,166,572 B2
(45) Date of Patent: Dec. 10, 2024

(54) RADIO FREQUENCY JAMMING OR INTERFERENCE DETECTION AND MITIGATION IN AN ELECTRONIC MONITORING SYSTEM

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 366 days.

(21) Appl. No.: 17/834,101

(22) Filed: Jun. 7, 2022

(65) Prior Publication Data

US 2022/0393785 A1    Dec. 8, 2022

Related U.S. Application Data

(60) Provisional application No. 63/208,215, filed on Jun. 8, 2021.

(51) Int. Cl.
*H04K 3/00* (2006.01)
*H04W 28/02* (2009.01)
*H04W 72/0453* (2023.01)
*H04W 76/15* (2018.01)

(52) U.S. Cl.
CPC ............. *H04K 3/255* (2013.01); *H04K 3/226* (2013.01); *H04W 28/0236* (2013.01); *H04W 72/0453* (2013.01); *H04W 76/15* (2018.02)

(58) Field of Classification Search
CPC ....... H04K 3/255; H04K 3/226; H04W 76/15; H04W 28/0236; H04W 72/0453
See application file for complete search history.

(56) References Cited

U.S. PATENT DOCUMENTS

| | | | |
|---|---|---|---|
| 2011/0151768 A1 | 6/2011 | Snider et al. | |
| 2013/0033381 A1 | 2/2013 | Breed | |
| 2019/0044641 A1 | 2/2019 | Trundle et al. | |
| 2020/0259702 A1* | 8/2020 | Agrawal | H04L 41/0668 |
| 2022/0393785 A1* | 12/2022 | McRae | H04K 3/255 |
| 2022/0394439 A1* | 12/2022 | McRae | H04W 76/10 |
| 2022/0417810 A1* | 12/2022 | McRae | H04W 84/12 |
| 2022/0418024 A1* | 12/2022 | McRae | H04W 12/50 |

(Continued)

FOREIGN PATENT DOCUMENTS

| | | | | |
|---|---|---|---|---|
| CA | 3008158 A1 * | 1/2019 | | G06F 11/1464 |
| CA | 2813983 C * | 1/2021 | | G05B 15/02 |

(Continued)

*Primary Examiner* — Adam D Houston
(74) *Attorney, Agent, or Firm* — Boyle Fredrickson S.C.

(57) ABSTRACT

An electronic monitoring system and method are provided. The electronic monitoring system monitors communication of data between a device primary radio of a monitoring device and a hub primary radio through a primary communication path. Communication of the data is transferred to a secondary communication path between a device secondary radio of the monitoring device and a hub secondary radio in response to the detection of a disruption on the primary communication path resulting from interference or jamming of communications over the primary communication path. The primary and secondary radios operate a different frequencies.

20 Claims, 4 Drawing Sheets

(56) References Cited

U.S. PATENT DOCUMENTS

2023/0092530 A1* 3/2023 McRae ............... G06T 5/90
348/143
2024/0119828 A1* 4/2024 Wright ............... G08B 25/10

FOREIGN PATENT DOCUMENTS

| EP | 4096345 A1 * | 11/2022 | ........... G08B 25/004 |
| EP | 4114136 A1 * | 1/2023 | ............. H04L 45/22 |
| EP | 4152761 A1 * | 3/2023 | ............. G06T 5/007 |
| FR | 3073070 A1 * | 5/2019 | ............. G08B 25/10 |

* cited by examiner

RADIO FREQUENCY JAMMING OR INTERFERENCE DETECTION AND MITIGATION IN AN ELECTRONIC MONITORING SYSTEM

CROSS-REFERENCE TO RELATED APPLICATIONS

The present application claims priority to U.S. Provisional Application No. 63/208,215, filed on Jun. 8, 2021, the entire contents of which are incorporated herein by reference.

FIELD OF THE INVENTION

The present invention relates generally to electronic monitoring systems, and in particular, to a system and method having an electronic monitoring system and method having radio frequency (RF) jamming or interference detection and mitigation capability.

BACKGROUND OF THE INVENTION

Security and other monitoring systems are increasing in popularity and technical sophistication. Recent monitoring systems implemented through WLANs (wireless local area networks) have simplified hardware mounting and installation by eliminating various hardwired signal-conducting wires. Such systems typically include one, and more typically several, monitoring devices, such as cameras and sensors, that communicate wirelessly with a base station hub in communication with a wide area network (WAN), typically via the Internet. The base station hub also communicates wirelessly with one or more user devices such as a smart phone, and possibly with an external server such as a cloud-based server.

Although avoiding hardwired component connections can simplify initial component mounting or installation, troubleshooting WLAN-based monitoring systems can present numerous challenges. For example, cameras and other networked devices can be rendered inoperable by interference from other devices (such a microwaves, etc) or by being purposefully jammed using devices that saturate the networking spectrum. Currently, cameras or networked devices that experience these issues just fall offline and are no longer operable or reachable by the end user. This failure is a nuisance at the very least, and can be a serious problem if these devices are used for security purposes.

Since there are no physical connections or conductors between the monitoring devices and the remainder of the system to visually inspect or evaluate with testing equipment, when such issues or faults arise, the users or technical support personnel generally have no or little insight into the problem. Available approaches are limited, and include various blind-troubleshooting methods, which typically include guessing with no feedback or indications of component statuses. In addition, the user often is given little or no information concerning the cause of a disruption, apart possibly from the display of a very simple message such as "CONNECTION LOST".

In view of the foregoing, it can be appreciated that a need has arisen to provide a system and methodology to detect and mitigate the radio frequency (RF) jamming or interference of a monitoring device of an electronic monitoring system. The need also has arisen to provide an electronic monitoring system in which cameras and other networked monitoring devices stay connected and operational through the interference or jamming of a primary or secondary radio, and in which a user is notified of the service disruption on the uninterrupted radio so the user can take action.

SUMMARY OF THE INVENTION

In accordance with the present invention, an electronic monitoring system is provided. The electronic monitoring system includes a monitoring device configured to monitor a characteristic within the environment. The monitoring device includes a device primary radio defined within a primary communication path and a device secondary radio defined within a secondary communication path. Circuitry is configured to allow the monitoring device to selectively communicate on one of the primary communication path and the secondary communication path. A hub primary radio is connectable to a backend control service system through a WAN (wide area network) and is defined within the primary communication path. The hub primary radio is configured to communicate with the monitoring device thereon. A hub secondary radio is connectable to the backend control service system through the WAN and is defined within the secondary communication path. The hub secondary radio is configured to communicate with the monitoring device thereon.

The primary communication path has an operational state and a fault state. The circuitry is configured to determine a fault state on the primary communication path. When the primary communication path is in an operational state, the device primary radio and the hub primary radio communicate through the primary communication path. When the primary communication path is in a fault state, the device secondary radio and the hub secondary radio communicate through the secondary communication path. When the primary communication path returns to the operational state after being in the fault state, the circuitry is configured to reconnect the device primary radio to the hub primary radio to allow communication through the primary communication path.

The fault state is defined at least in part by a radio frequency (RF) jamming of communication between the device primary radio and the hub primary radio through the primary communication path; a disruption of communication between the device primary radio and the hub primary radio through the primary communication path; or interference of communication through the primary communication path in response to operation of one or more electronic devices.

The circuitry of the monitoring device is configured to detect a communication failure through the primary communication path. Further, the circuitry of the monitoring device is configured to activate the device secondary radio upon detection of the communication failure through the primary communication path. More specifically, upon detection of the communication failure between the device primary radio and the hub primary radio through the primary communication path, the circuitry is configured to: conduct a roaming scan through the primary communication path; attempt to reestablish communications through the primary communication path; and, upon failure to reestablish communications through the primary communication path, activate the device secondary radio to communicate with the hub secondary radio through the secondary communication path.

A user interface of a user-operated device or simply "user device", such as a smart phone or tablet, may be operatively connected to the WAN. The circuitry configured to identify the communication failure detected through the primary communication path and communicate information corresponding to the detected communication failure to the user interface for display on the user interface. The user interface includes an actuatable user input. The user interface may be used to transmit an alarm signal to the measuring device through the secondary communication path in response to actuation of the user input and/or to transmit a help request signal to law enforcement in response to actuation of the user input.

The monitoring device may be one or more of an imaging device that is configured to capture visual images or video of a monitored area within the environment, an audio device, and a sensor. The audio device includes at least one of: (i) a microphone, and (ii) a speaker configured for audio communication or providing audible alerts. The sensor may be configured to detect at least one of: (i) motion, (ii) opening or closing events or doors or windows, (iii) smoke, (iv) carbon monoxide, (v) water leaks, and (vi) temperature changes.

The device primary radio and the hub primary radio communicate through the primary communication path at a first frequency. The device secondary radio and the hub secondary radio communicate through the secondary communication path at a second frequency that is immune or at least less susceptible to signals that interfere with or jam the first frequency. It is contemplated for the second frequency of the secondary communication path is in a sub-GHz (gigahertz) frequency band, whereas the primary frequency and primary communication bath may be above a GHz band, typically 2.4 GHz or 5 GHz.

In accordance with a still further aspect of the present invention, a method is provided for detecting and mitigating interference in an electronic monitoring system. The method includes the step of monitoring communication of data between a device primary radio of a monitoring device and a hub primary radio through a primary communication path. A disruption in communication is detected through the primary communication path. Thereafter, communication of the data is transferred to a secondary communication path between a device secondary radio of the monitoring device and a hub secondary radio in response to detection of the disruption.

The data is transmitted on the primary communication path at a first frequency. The data is transmitted on the secondary communication path at a second frequency that is immune to or at least less susceptible to interference or jamming by signals that jam communications over the first frequency. The second frequency may be less than the first frequency, such is in a sub-GHz frequency band. The step of detecting the disruption in communication through the primary communication path may include the additional step of monitoring for at least one of a radio frequency (RF) jamming communication between the device primary radio and the hub primary radio through the primary communication path; an interruption of communication between the device primary radio and the hub primary radio through the primary communication path; and interference of communication through the primary communication path in response to operation of one or more electronic devices. Communication of the data is transferred back to the primary communication path in response to termination of the disruption on the primary communication path.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE DRAWINGS

Figure 1:
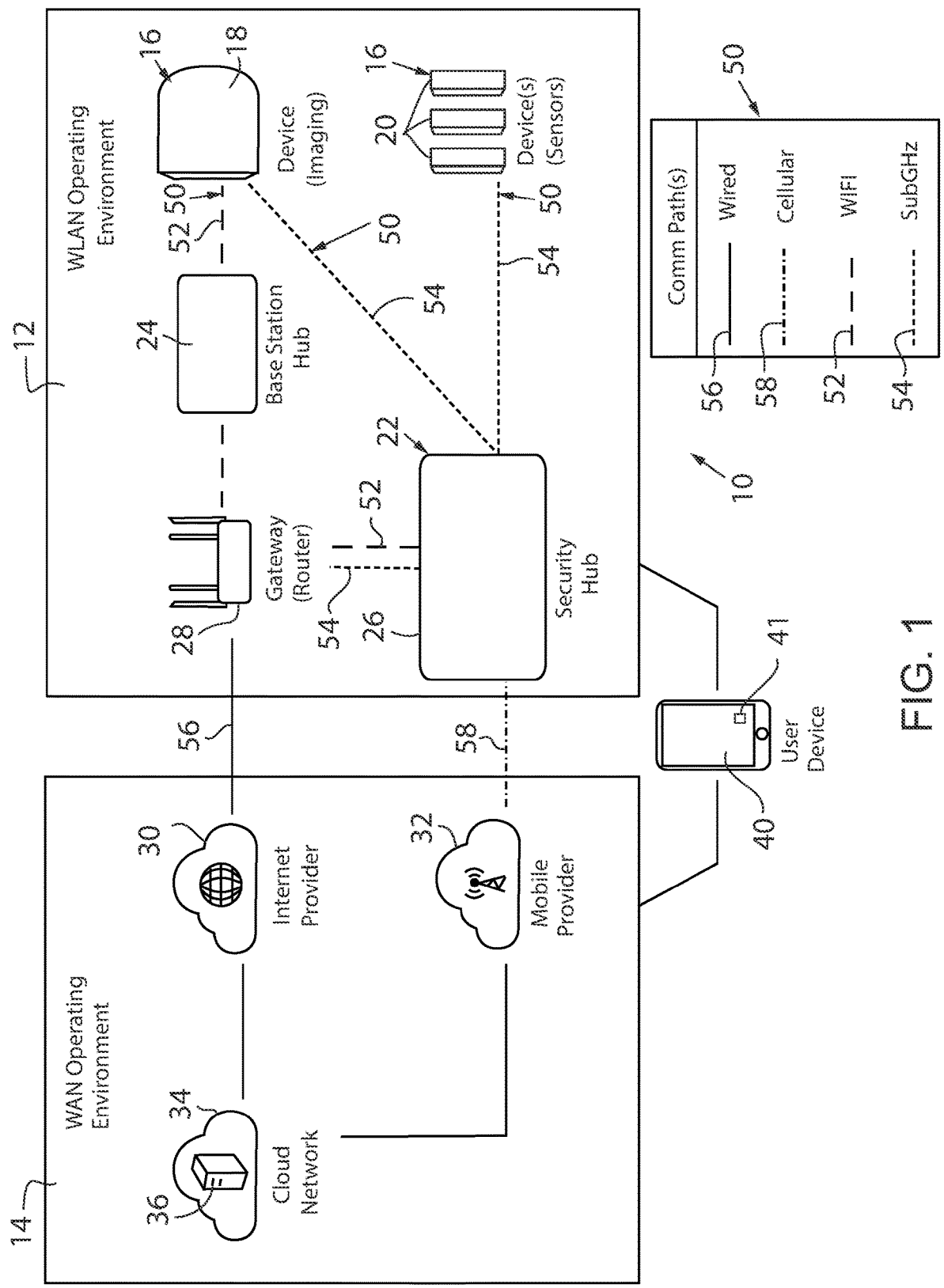
FIG. 1 is a schematic representation of an electronic monitoring system with a secondary communication path in accordance with an aspect of the invention.

Referring to FIG. 1, an electronic monitoring system 10 in accordance with an aspect of the present invention is generally designated by the reference numeral 10. Electronic monitoring system 10 is implemented in a WLAN (wireless local area network) operating environment or WLAN 12. The WLAN 12 is communicatively connected to a WAN (wide area network) operating environment or WAN 14. Within WLAN 12, various monitoring devices 16, sometimes referred to as "client devices," are wirelessly networked to a base station or high frequency hub 24 which, in turn, communicates with the WAN 14 via a gateway hub shown as gateway router 28. Most systems will employ several monitoring devices 16 of the same or varying configurations as described below. Base station hub 24 and router 28 provide a high frequency connection to the WAN 14. Base station hub 24 may be eliminated as a stand-alone module if its functionality is incorporated into the gateway router 28, in which case the router also serves as a base station hub. The system also includes a security hub 26 that communicates with the monitoring device(s) 16 and with the WAN 14 and that provides a low frequency connection between the WAN 14 and the monitoring devices 16. It also communicates with the router or hub 28, such as through a high frequency connection 52 and/or a low frequency connection 54 to the router 28. The security hub 26 is also provided with the capability providing a high frequency connection with the monitoring devices 16. Thus, it is contemplated for monitoring devices 16 to have two radios operating at different frequencies. A first, "primary" radio operates at a first frequency, typically at a relatively high frequency, typically of 2.4 GHz to 5 GHZ, during period of normal conductivity to perform monitoring and data capture functions such as video capture and transmission, sound transmission, motion sensing, etc. The second or "secondary radio" operates at a second frequency that is immune or at least resistant to resistance from signals that typically jam signals over the first frequency. The second frequency may be of considerably lower frequency in the sub-GHz or even RF range and may have a longer range than the primary radio. As hereinafter described, the secondary radio may be operable, when communications over the primary communication path are disrupted, to permit the continued operation of monitoring devices 16, as well as, to permit transmit and display information regarding the communications disruption to be transmitted and displayed for a user. The term "disruption," as used herein, applies equally to an initial failure to connect over the primary communication path upon device startup and a cessation or break in connection after an initial successful connection.

Still referring to FIG. 1, each monitoring device 16 may perform a variety of monitoring, sensing, and communicating functions. One such device may include an imaging device 18, such as a video camera, that is configured to capture and store visual images or video of the monitored area within the environment. One such camera is a video camera, which could be an Arlo® camera available from Arlo Technologies, Inc. of Carlsbad, California Typically, system 10 will include multiple monitoring devices 16 that are mounted to face toward respective areas being monitored, such as around a building or other structure or area. In addition to containing a camera, the imaging device 18 may also include a one or more sensors configured to detect one or more types of conditions or stimulus, for example, motion, opening or closing events of doors or windows, the presence of smoke, carbon monoxide, water leaks, and temperature changes. Instead of or in addition to containing sensors, the imaging device 18 may have audio device(s) such as microphones, sound sensors, and speakers configured for audio communication or providing audible alerts. Monitoring devices 16 other than imaging devices also may have some combination of sensors and/or audio devices without having imaging capability. One such device is Arlo Chime™ which has only audio capabilities. Other monitoring devices contain only sensors as indicated by reference character 20 in FIG. 1. The imaging devices 18, sensors 20, or other monitoring devices 16 also may be incorporated into form factors of other house or building accessories, such as doorbells, floodlights, etc.

Still referring to FIG. 1, gateway router 28 is typically implemented as a WIFI hub that communicatively connects WLAN 12 to WAN 14 through an internet provider 30. Internet provider 30 includes hardware or system components or features such as last-mile connection(s), cloud interconnections, DSL (digital subscriber line), cable, and/or fiber-optics. As mentioned, the functionality of the base station hub 24 also could be incorporated into the router 28, in which case the router 28 becomes the base station hub, as well as the router. Another connection between WLAN 12 and WAN 14 may be provided between security hub 26 and a mobile provider 32. Mobile provider 32 includes hardware or system components or features to implement various cellular communications protocols such as 3G, 4G, LTE (long term evolution), 5G, or other cellular standard(s).

Besides the mobile connection, security hub 26 typically also is configured to connect to WAN 14 by way of its connection to router hub 28 and the router hub's connection to WAN 14 through internet provider 30. Each of the internet provider 30 and mobile provider 32 allows the components of system 10 to interact with a backend system or control services that can control functions or provide various processing tasks of components of system 10, shown as a cloud-based backend control service system 34, which could be an Arlo SmartCloud™ system. The backend system, such the cloud-based control service system 34 includes at least one server 36 and typically provides, for example, cloud storage of events, AI (artificial intelligence) based processing such as computer vision, and system access to emergency services.

Still referring to FIG. 1, one or more user devices 40, such as a smart phone, tablet, laptop, or PC, may communicate with various components or devices within each of WLAN 12 and WAN 14 to provide an interface through which a user may interact with system 10. Each user device 40 includes a display system that typically includes both an audio display and a video display such as a touchscreen. Each user device 40 also has internal computing and storage capabilities and a program or application, such as the Arlo Smart application, serving as the user interface with the remainder of system 10.

Still referring to FIG. 1, within WLAN 12, multiple communication paths 50 are defined that transmit data between the various components of system 10. Communication paths 50 include a default or primary communication path 52 providing communication between the monitoring device 16 and the base station hub 26, and a fail-over or fallback secondary communication path 54 providing communication between the monitoring device 16 and the security hub 26. Optionally, some of the monitoring devices 16 that do not require high bandwidth to operate may only communicate through the secondary communication path 54, such as the sensors 20 shown in FIG. 1. Thus, even during a failure of the primary communication path 52, sensors 20 will continue to operate normally. A collective area in which device communication can occur through the primary communication path 52 defines a primary coverage zone. A second, typically extended, collective area in which the device communication can occur through the secondary communication path 54 defines a secondary coverage zone. A wired communication path 56 is shown between the router 28 and the internet provider 30, and a cellular communication path 58 is shown between security hub 26 and mobile provider 32. WAN 14 typically includes various wireless connections between or within the various systems or components, even though only wired connections 56 are shown. The controller of one or more of the monitoring devices 16 also could provide a wireless communication path 52 directly to the router 28.

Figure 2:
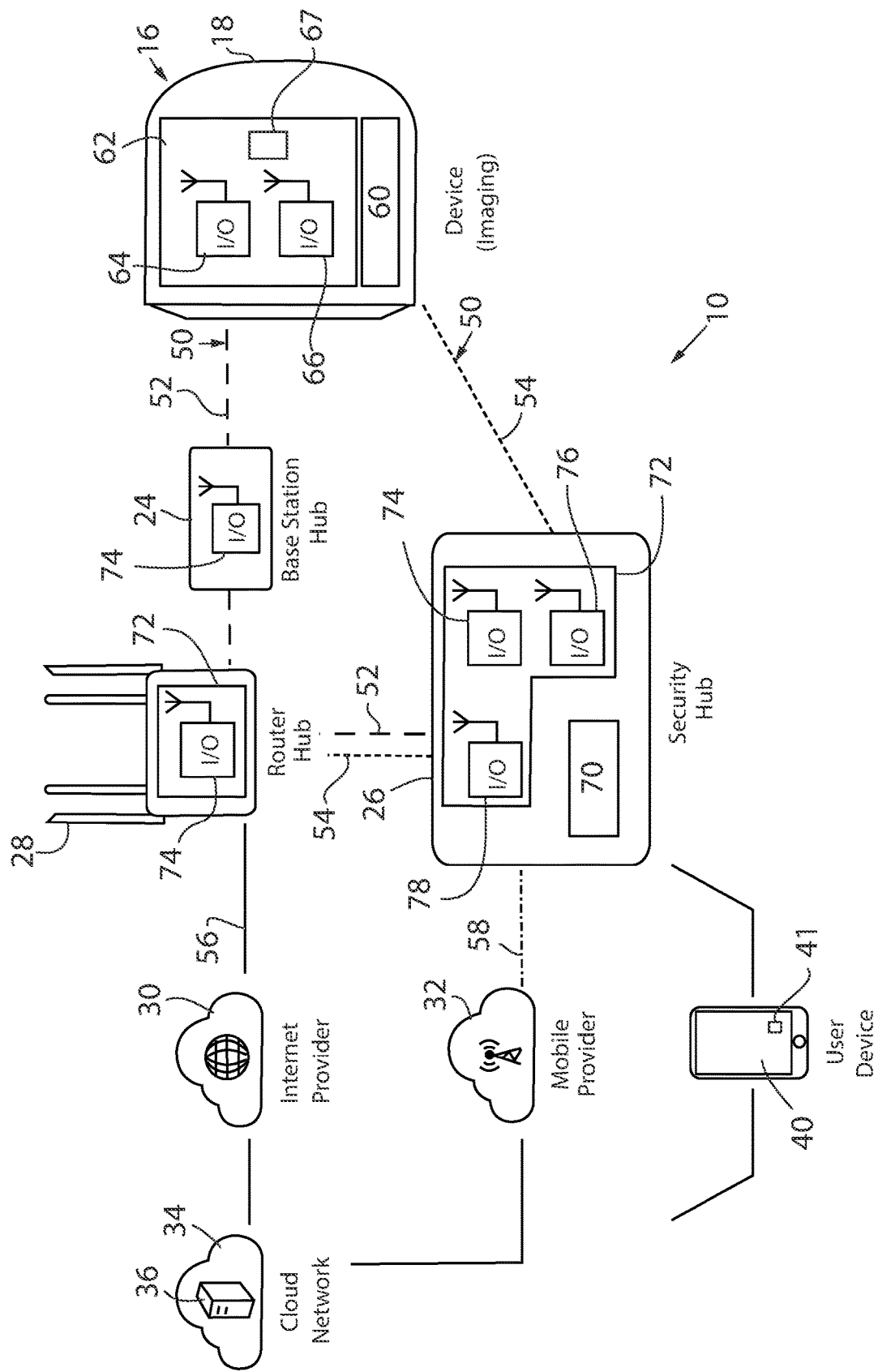
FIG. 2 is a schematic representation of a variant of the electronic monitoring system with a secondary communication path of FIG. 1 in accordance with an aspect of the invention.

Referring now to FIG. 2, system 10 is configured to implement a seamless communication environment by implementing a communication path switching strategy as a function of the operational state of primary and/or secondary communication paths 52, 54. The seamless communication environment may be achieved by providing the monitoring device(s) 16 and hubs 24 and 26 with circuitry, software, and cooperating components that facilitate recognizing, for example, connectivity issues in the primary communication path 52. If connectivity issues in the primary communication path 52 are recognized, then system 10 automatically switches to implementing data transfer through the secondary communication path 54 in order to maintain communications through system 10 and facilitate troubleshooting the issues with primary communication path 52.

Still referring to FIG. 2, each monitoring device 16 is configured to acquire data and to transmit it to a respective hub 24 and/or 26 for further processing and/or further transmission to a server such as the server 36 of the cloud-based control service system 34 and/or the user device(s) 40. The server 36 or other computing components of system 10 or otherwise in the WLAN 12 or WAN 14 can include or be coupled to a microprocessor, a microcontroller or other programmable logic element (individually and collectively considered "a controller") configured to execute a program. The controller also may be contained in whole in the monitoring device 16, base station hub 24, security hub 26, and/or the WIFI hub or router 28. Alternatively, interconnected aspects of the controller and the programs executed by it could be distributed in various permutations within the monitoring device 16, the hubs 24 and 26, router 28, and the server 36. This program may be utilized in filtering, processing, categorizing, storing, recalling and transmitting data received from the monitoring device 16 via the hubs 24 and 26, router 28, and server 36. Server 36 or other appropriate system device may also be in communication with or include a computer vision program ("CV"), which can apply one or more filters or processes, such as edge detection, facial recognition, motion detection, etc., to detected one or more characteristics of the recording such as, but not limited to, identifying an individual, animal, vehicle, or package present in the recording.

Still referring to FIG. 2, each monitoring device 16 may be battery powered or wired to a power source and is shown here with a power supply 60. Each monitoring device 16 has circuitry 62 that includes corresponding hardware, firmware, software, or any combination thereof. In the case of a camera-type imaging device 18 that may also have sensors and audio capability, the circuitry 62 may include, for example, imagers, an audio circuit, a media encoder, a processor, and a non-transient memory storage device, among other components. Regardless of the particular type of monitoring device 16, the circuitry 62 of monitoring devices 16 also includes multiple wireless I/O communication devices or radios, including a device primary radio 64 and a device secondary radio 66 and, optionally, a radio frequency detector and/or a wireless frequency spectrum analyzer 67. The device primary radio 64 communicates with the hub primary radio 74 via the primary communication path 52. The device secondary radio 66 communicates with the security hub secondary radio 76 via the secondary communication path 54.

Still referring to FIG. 2, as shown in security hub 26, each hub has circuitry 72 that includes corresponding hardware, firmware, software, or any combination thereof for controlling, for example, data transmission or other communications through respective segments of system 10. Circuitry 72 includes a processor and a non-transient memory storage device, among other components. Circuitry 72 of the different hubs of system 10 may have different numbers and types of wireless I/O communication devices or radios, while allowing for the establishment discrete communication paths 50, with each radio including, for example, a transceiver and cooperating antenna for transmitting and receiving signals or data. For example, the circuitry 72 of router 28 is shown with a primary radio 74 that transmits and receives data within the WLAN 12 (FIG. 1), whereas the circuitry of security hub 26 is shown with multiple radios. The security hub 26 includes a hub primary radio 74 which communicates with the primary radio 74 of router 28, a hub secondary radio 76 which communicates with the secondary radio 66 of the monitoring device 16 through the communication paths 54 of WLAN 12 (FIG. 1), and a cellular radio 78 that transmits data between the WLAN 12 (FIG. 1) and WAN 14 (FIG. 1) through the cellular communication path 58.

Still referring to FIG. 2, primary radios 64, 74 transmit data at different frequencies and bandwidths than the secondary radios 66, 76 so that the primary and secondary communication paths 52, 54 correspondingly define different operational frequencies and bandwidths. While it is conceivable that the secondary communication path 54 may have a higher frequency than the primary communication path 52, the primary communication path 52 has a higher frequency, a higher bandwidth, and a lower range than the secondary communication path 54. More typically, the primary communication path 52 provides medium range connectivity and operates using a WIFI communication protocol, such as those prescribed by the IEEE 802.11 standards. Although the primary communication path 52 is illustrated as a single path, it is understood that the primary communication path 52 may provide multi-component WIFI communications by, for example, dual-band implementation(s) and corresponding radio(s) that can communicate at both 2.4 GHz and 5 GHz WIFI frequencies. Suitable frequencies for secondary communication path 54 include but by no means are limited to, RF ranges of 800-900 Mhz, 80-90 Mhz, and cellular (3G, 4G, LTE, 5G) bands, and which may be a proprietary communications protocol, such as the ArloRF sub-GHz protocol.

Figure 3:
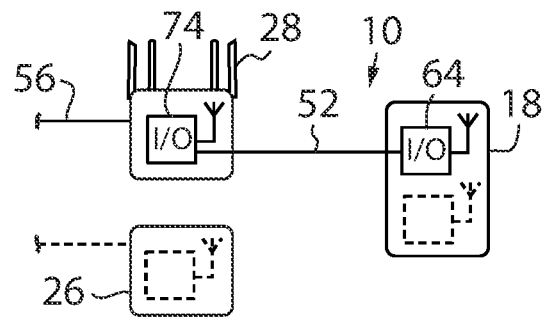
FIG. 3 is a schematic representation of data communication through a primary communication path of the system in an operational state in accordance with an aspect of the invention.
Figure 4:
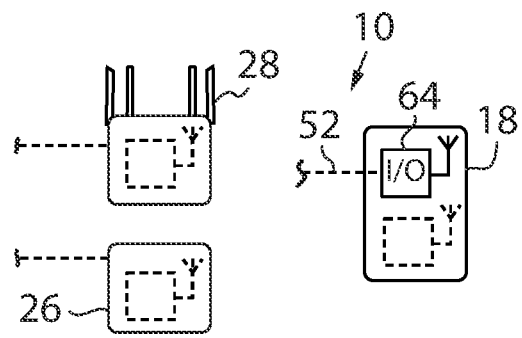
FIG. 4 is a schematic representation of disrupted communications due to a connectivity issue in the primary communication path of the system of FIG. 3 in a fault state in accordance with an aspect of the invention.

Referring to FIGS. 3-6, a representation of radio and communication path control methodologies is illustrated using an example with an imaging device 18 as a monitoring device 16 (FIG. 1) and with different radios implemented in different hubs (FIG. 1) as security hub 26 and router 28. Referring now to FIG. 3, system 10 is shown in a default and functioning operational state. The primary communication path 52 is properly functioning and communicatively connecting device primary radio 64 of imaging device 18 through the base station hub 24 (if present) and to the primary radio 74 of router 28. In a WIFI implementation, router 28 provides WIFI communications of the default primary connection within the WLAN 12 (FIG. 1) for transmitting data through system 10 and typically from WLAN 12 (FIG. 1) to WAN 14 (FIG. 1) through the internet provider system 30 (FIG. 1) for processing by server 36 (FIG. 1). The data transmitted through the primary communication path 52 may include monitoring data. Monitoring data is typically data that corresponds to the normal use of a particular monitoring device. For example, monitoring data from imaging device 18 may include data packets corresponding to an image, captured frames, or a video clip. If the monitoring device additionally includes a motion sensor and a microphone, it may also include a trigger signal indicative of activation of the sensor and/or sound.

The system 10, typically the imaging device 18, can monitor the primary communication path 52 for a fault state resulting from radio frequency (RF) jamming of communications by a third party, interference of communications resulting from operations of other electronic devices, or a disruption in communications due to other factors. These disruptions can occur for any of number or reasons. Examples include a primary RF (radio frequency) network outage, a primary ISP (internet service provider) outage, a primary network SSID (service set identifier) change, a primary network password or authentication failure, a possible moving of the imaging device 18 out of range of the primary radios 64, 74 (FIG. 2), network interference issues, and power loss issues. By way of example, radio frequency detector and/or a wireless frequency spectrum analyzer 67 may be used to measure signals and interference on the primary communication path 52. Significantly for the purposes of the present invention, the imaging device 18 may detect a communication failure, typically in the form of a disruption/interruption resulting from radio frequency (RF) jamming of communications by a third party, interference of communications resulting from operations of other electronic devices, or a disruption in communications due to other factors; for example, by way of a device polling strategy, roaming scan, or other suitable connectivity-confirmation technique. For example, imaging device 18 may determine RF jamming of communications on the primary communication path 52 by a third party using packet delivery ratio (PDR), signal strength (SS), or carrier sensing time (CST).

When imaging device 18 detects a fault state, it may command a response from itself, which may include attempting to reconnect primary radio 64 of imaging device 18 to primary radio 74 of router hub 28. If the primary communication path 52 is defined by a dual-band WIFI system, imaging device 18 may attempt to reconnect the primary radios 64, 74 by broadcasting through the other WIFI frequency than what was dropped in the interruption. For example, if a 5 GHz connection dropped, then imaging device 18 may command an attempted establishment of a 2.4 GHz connection to establish communications through the primary communication path 52.

Figure 5:
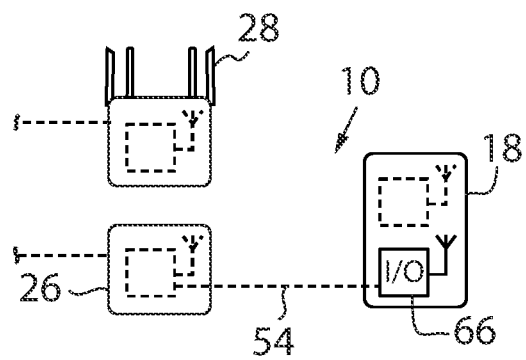
FIG. 5 is a schematic representation of an initiation of establishing a secondary communication path of the system of FIG. 3 in accordance with an aspect of the invention.

Referring now to FIG. 5, if reconnection through the primary communication path 52 fails, then a fail-over path switching event occurs automatically within imaging device 18 to provide seamless communication through system 10. Typically, any gap in data transmission only corresponds to an amount of time in recognition of the fault state and/or attempted reconnection of the primary communication path 52. The fail-over automatic switching includes activating the device secondary radio 66 within imaging device 18, which is typically in a low power state or "sleep" mode while system 10 is in an operational state with the primary communication path 52 connected. When activated by a trigger event such as the failing of one or more failed reconnection attempts of the primary communication path 52, the imaging device 18 activates the device secondary radio 66 and its data transmissivity to secondary radio 76 of security hub 26.

Figure 6:
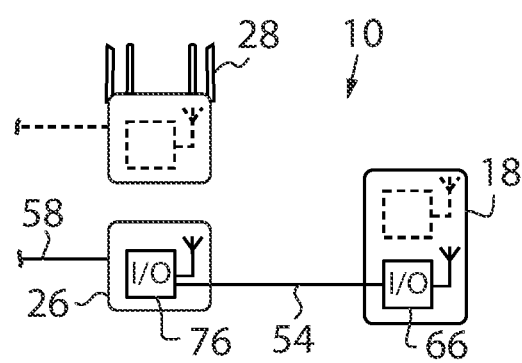
FIG. 6 is a schematic representation of data communication through the secondary communication path of the system of FIG. 3 in accordance with an aspect of the invention.

Referring now to FIG. 6, when a fail-over or fallback connection is made for communications through the secondary communication path 54, device secondary radio 66 of imaging device 18 is communicatively connected to secondary radio 76 of security hub 26. In a sub-GHz implementation of security hub 26, this fallback or secondary connection provides sub-GHz communications within the WLAN 12 (FIG. 1) for transmitting data between imaging device 18 (FIG. 1) and the security hub 26. As previously described, security hub 26 is typically configured for data transmission on a cellular, sub-GHz, frequency for communication between WLAN 12 (FIG. 1) to WAN 14 (FIG. 1) through mobile provider system 32 (FIG. 1) or through internet provider 30 (FIG. 1). Hence, by communicatively connecting secondary radio 66 of imaging device 18 to secondary radio 76 of security hub 26, imaging device 18 may continue to interact with cloud-based backend control service system 34, as heretofore described, and with the one or more user devices 40, thereby maintaining an interface through which a user may interact with imaging device 18.

The system 10, typically the imaging device 18, may monitor the secondary communication path 54 for a fault state resulting from the jamming of communications on secondary communication path 54 by a third party. If imaging device 18 detects a communication disruption/interruption on both the primary communications path 52 and the secondary communication path 54 as a result of the jamming of communications thereon by a third party, imaging device 18 may generate an audio or visual alarm. Conversely, if imaging device 18 detects loss of communication due to interference or some other disruption, it may generate a less urgent communication, such as a red or flashing status indictor light, without generating an alarm.

Once communication is established on secondary communication path, it can be understood that data packets corresponding to sounds, images, captured frames, and/or video clips captured by imaging device 18 may be transmitted from imaging device 18 through the secondary communication path 54 and security hub 26 to cloud-based backend control service system 34 and/or to the one of more user devices 40, as heretofore described. In addition, data packets including information corresponding to and/or describing the basis for the disruption/interruption of communication, or in other words basis for the fault state of primary communication path 52, may be transmitted from the device secondary radio 66 through the secondary communication path 54 and the secondary radio 76 of security hub 26. For example, these data packets may include information regarding a disruption/interruption resulting from radio frequency (RF) jamming of communications by a third party, interference of communications resulting from operations of other electronic devices, or a disruption in communications due to other factors.

It can be appreciated that the noted information may be used by controller to analyze the fault condition of the connectivity failure in the primary communication path 52 or conduct a diagnostic scan on imaging device 18 or system 10 to facilitate the troubleshooting of potential issues therewith. It is further contemplated for such information to be accessible to a user through the one or more user devices 40, such as through a notification or a corresponding graphical icon provided on a display of the one or more user devices 40 or through sequential menus that can be navigated by the user on the one or more user devices 40. One or more user devices 40 may include at least one actuatable user input 41, FIGS. 1-2. In response to the information provided on the display of the one or more user devices 40, a user may actuate the at least one actuatable user input 41 to address the information. For example, in response to notification of signal jamming, actuation of the at least one actuatable user input 41 by a user may cause the corresponding one or more user device 40 to transmit a desired instruction to imaging device 18 over the secondary communication path 54 to generate an audio alarm, and/or to transmit a help request signal to law enforcement, either directly or through the hub 24.

Figure 7:
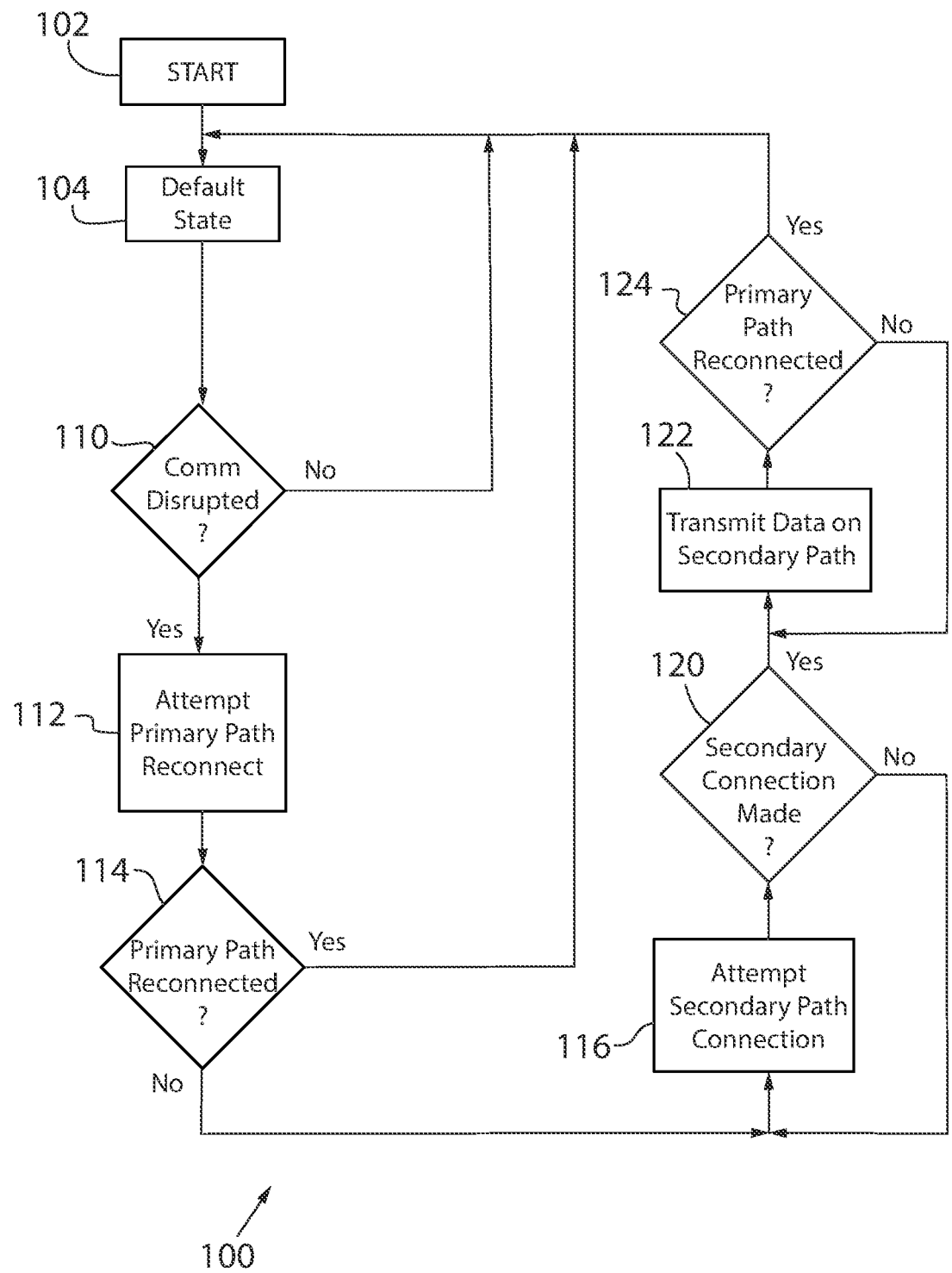
FIG. 7 is a flow chart illustrating a communication path switching operation for maintaining system communications during connection issues of a primary communication path in accordance with an aspect of the invention.

Referring now to FIG. 7 and with background reference to FIGS. 1 and 2, the automatic fallback communication path switching of a system 10 including a monitoring device 10, hubs 24, 26, etc., is shown schematically in the flowchart as process 100, which starts at block 102. At block 104, system 10 is in an operational state in which communications are made through the primary communication path 52. At decision block 110, monitoring device 16 evaluates, as heretofore described, whether the primary communication path 52 is functioning or if there is a connectivity issue or other communications disruption such that primary communication path 52 is in a fault state.

If no disruption in communication along primary communications path 52 is detected, system 10 remains in the default operational state and communications continue through the primary communication path 52. If, at decision block 110, there is a connectivity issue or communication(s) disruption, primary radio 64 of monitoring device 16 attempts to reconnect to primary radio 74 of hub 24 at block 112. At decision block 114, monitoring device 16 evaluates whether the reconnecting attempt was successful. If the reconnection was successful, system 10 is restored to the default operational state at block 104, and system communications continue through the primary communication path 52 at block 106. If it is determined at decision block 114 that the reconnection attempt has failed, then a fail-over or fallback switching event(s) activates the secondary radios 66, 76 in block 116 in an attempt to establish communications through the secondary communication path 54. At decision block 120, the monitoring device evaluates whether the connection was made between the secondary radios 66, 76 such that data transfer is occurring through the secondary communication path 54. If not, then monitoring device 16 commands a reconnection attempt of the secondary radios 66, 76. If no connection is made through the secondary communication path 54 after a certain number of attempts or a certain amount of elapsed time for the attempts as dictated by, for example, a stored program on the monitoring device 16 or server 36, then server 36 may push an automated message to user device 40 indicating a total communication failure within system 10. In addition, if monitoring device 16 determines communications on both the primary communications path 52 and the secondary communications path 54 are being jammed by a third party, monitoring device 16 generates an alarm signal. If connection is recognized between the secondary radios 66, 76 at decision block 120, then the secondary communication path 54 is active.

As heretofore described, in the case of the monitoring device being an imaging device 18, with secondary communication path 54 active, data packets corresponding to sounds, images, captured frames, and/or video clips captured by imaging device 18 may be transmitted from imaging device 18 through the secondary communication path 54 and security hub 26 to backend control service system 34 and/or to the one or more user devices 40. The backend control service system 34 could be cloud-based. In addition, data packets including information corresponding to and/or describing the basis for the disruption of communication, or in other words basis for the fault state of primary communication path 52, may be transmitted through the secondary communication path 54 and security hub 26. For example, these data packets may include information regarding a disruption resulting from radio frequency (RF) jamming of communications by a third party, interference of communications resulting from operations of other electronic devices or a disruption in communications due to other factors. Data, including diagnostic data is transmitted though the secondary communication path 54 at block 122. For example, if it is determined that disruption/interruption of the primary communication path 52 is a result of radio frequency (RF) jamming of the communications by a third party, a "WIFI COMMUNICATION JAMMED" message or a corresponding graphical icon may be transmitted to and displayed on the user device 40. In response, a user of system 10 or technical support personnel may address the issues(s) in the primary communication path 52. For example, the user may transmit instructions to imaging device 18 to generate an audio alarm and/or to transmit a help request signal to law enforcement utilizing user device 40.

At subsequent decision block 124, monitoring device 16 evaluates whether communication through the primary communication path 52 has been restored or reconnected. If the primary path's 52 connection is not restored, then communication is maintained through the secondary communication path 54 using the secondary radios 66 and 76. If the monitoring device 16 recognizes that communications through the primary communications path 52 are restored at decision block 124, then the process returns to block 104, where the system 10 operates in the default state with communication over the primary path 52 using the primary radios 64, 74.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:
1. An electronic monitoring system comprising:
a monitoring device configured to monitor a characteristic within the environment, the monitoring device including:
a device primary radio defined within a primary communication path;
a device secondary radio defined within a secondary communication path; and
circuitry configured to allow the monitoring device to selectively communicate on one of the primary communication path and the secondary communication path;
a hub primary radio being defined within the primary communication path, the hub primary radio configured to communicate with the monitoring device thereon over a first frequency; and
a hub secondary radio being defined within the secondary communication path, the hub secondary radio configured to communicate with the monitoring device thereon over a second frequency that is different than the first frequency.
2. The electronic monitoring system of claim 1, wherein the primary communication path has an operational state and a fault state, and wherein the circuitry is configured to determine a fault state on the primary communication path such that:
when the primary communication path is in an operational state, the device primary radio and the hub primary radio communicate through the primary communication path; and
when the primary communication path is in a fault state, the device secondary radio and the hub secondary radio communicate through the secondary communication path.

3. The electronic monitoring system of claim 2, wherein, when the primary communication path returns to the operational state after being in the fault state, the circuitry is configured to reconnect the device primary radio to the hub primary radio to allow communication through the primary communication path.

4. The electronic monitoring system of claim 2, wherein the fault state is defined at least in part by radio frequency (RF) jamming of communication between the device primary radio and the hub primary radio through the primary communication path.

5. The electronic monitoring system of claim 2, wherein the fault state is defined at least in part by a disruption of communication between the device primary radio and the hub primary radio through the primary communication path.

6. The electronic monitoring system of claim 2, wherein the fault state is defined at least in part by interference of communication through the primary communication path in response to operation of one or more electronic devices.

7. The electronic monitoring system of claim 1, wherein circuitry of the monitoring device is configured to detect communication failure through the primary communication path.

8. The electronic monitoring system of claim 7, wherein the circuitry of the monitoring device is configured to activate the device secondary radio upon detection of the communication failure through the primary communication path.

9. The electronic monitoring system of claim 7, wherein, upon detection of the communication failure between the device primary radio and the hub primary radio through the primary communication path, the circuitry is configured to:
conduct a roaming scan through the through the primary communication path;
attempt to reestablish communications through the primary communication path; and
upon failure to reestablish communications through the primary communication path, activating the device secondary radio to communicate with the hub secondary radio through the secondary communication path.

10. The electronic monitoring system of claim 9, further comprising a user interface operatively connectable to the monitoring device, the circuitry configured to:
identify the communication failure detected through the primary communication path; and
communicate information corresponding to the detected communication failure to the user interface for display on the user interface.

11. The electronic monitoring system of claim 10, wherein:
the user interface includes an actuatable user input;
the user interface is configured to transmit an alarm signal to the monitoring device through the secondary communication path in response to actuation of the user input.

12. The electronic monitoring system of claim 10, wherein:
the user interface includes an actuatable user input; and
the user interface is configured to transmit a help request signal to law enforcement in response to actuation of the user input.

13. The electronic monitoring system of claim 1, wherein the monitoring device is defined by at least one of:
an imaging device that is configured to capture visual images or video of a monitored area within the environment;
an audio device that includes at least one of: (i) a microphone, and (ii) a speaker configured for audio communication or providing audible alerts; and
a sensor configured to detect at least one of: (i) motion, (ii) opening or closing events or doors or windows, (iii) smoke, (iv) carbon monoxide, (v) water leaks, and (vi) temperature changes.

14. The electronic monitoring system of claim 1, wherein the first frequency is higher than the second frequency.

15. The electronic monitoring system of claim 14, wherein the second frequency is in a sub-GHz (gigahertz) frequency band.

16. An electronic monitoring system, comprising:
an imaging device configured to monitor a characteristic within an environment, the imaging device including:
a device primary radio defined within a primary communication path and configured to communicate at a first frequency; and
a device secondary radio defined within a secondary communication path and configured to communicate at a second frequency, the second frequency being lower than the first frequency;
a hub primary radio connectable to a backend control service system through a WAN (wide area network) and being defined within the primary communication path, the hub primary radio configured to communicate with the device primary radio via the primary communication path; and
a hub secondary radio connectable to the backend control service system through the WAN and being defined within the secondary communication path, the hub secondary radio configured to communicate with the device secondary radio via the secondary communication path; and
circuitry configured to:
detect a communication failure through the primary communication path due to interference with or jamming of communications over the primary communication path; and
upon detection of the communication failure between the device primary radio and the hub primary radio through the primary communication path, activate the device secondary radio to communicate with the hub secondary radio through the secondary communication path.

17. The electronic monitoring system of claim 16, further comprising a user interface operatively connected to the WAN, the circuitry configured to:
identify the communication failure detected through the primary communication path; and
communicate information corresponding to the detected communication failure to the user interface for display on the user interface.

18. A method for detecting and mitigating interference in an electronic monitoring system, the method comprising:
monitoring communication of data between a device primary radio of a monitoring device and a hub primary radio through a primary communication path;
detecting a disruption in communication through the primary communication path, and
transferring communication of the data to a secondary communication path between a device secondary radio of the monitoring device and a hub secondary radio in response to detection of the disruption, the secondary communication path having a different frequency than the primary communication path.

19. The method of claim 18, wherein:
   data is transmitted on the primary communication path at a first frequency of at least 2.4 GHz; and
   data is transmitted on the secondary communication path at a second frequency, the second frequency is less than the first frequency and is in a sub-GHz frequency band.

20. The method of claim 19, wherein the step of detecting the disruption in communication through the primary communication path includes the additional step of monitoring for at least one of a radio frequency (RF) jamming communication between the device primary radio and the hub primary radio through the primary communication path, and interference of communication through the primary communication path in response to operation of one or more electronic devices.

\* \* \* \* \*